United States Patent
Khoryaev et al.

(10) Patent No.: US 10,439,769 B2
(45) Date of Patent: Oct. 8, 2019

(54) ENERGY-EFFICIENT DEVICE DISCOVERY TECHNIQUES

(71) Applicant: Intel IP Corporation, Santa Clara, CA (US)

(72) Inventors: Alexey Khoryaev, Nizhny Novgorod (RU); Debdeep Chatterjee, Santa Clara, CA (US); Mikhail A. Shilov, Nizhny Novgorod (RU); Sergey Panteleev, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 409 days.

(21) Appl. No.: 14/229,858

(22) Filed: Mar. 29, 2014

(65) Prior Publication Data

US 2015/0009875 A1    Jan. 8, 2015

Related U.S. Application Data

(60) Provisional application No. 61/843,826, filed on Jul. 8, 2013.

(51) Int. Cl.
*H04L 5/00* (2006.01)
*H04W 48/16* (2009.01)
(Continued)

(52) U.S. Cl.
CPC ........... *H04L 5/0007* (2013.01); *H04B 15/00* (2013.01); *H04J 11/00* (2013.01); *H04L 5/0005* (2013.01); *H04L 5/005* (2013.01); *H04L 5/0048* (2013.01); *H04L 5/0073* (2013.01); *H04W 8/005* (2013.01); *H04W 28/04* (2013.01); *H04W 28/08* (2013.01); *H04W 40/246* (2013.01);
(Continued)

(58) Field of Classification Search
None
See application file for complete search history.

(56) References Cited

U.S. PATENT DOCUMENTS

| 7,324,479 | B2 | 1/2008 | Hur | |
| 7,978,747 | B1 * | 7/2011 | Harris | H04B 1/707 370/328 |

(Continued)

FOREIGN PATENT DOCUMENTS

| KR | 10-2007-0120793 | 12/2007 |
| WO | 00-74275 | 12/2000 |

OTHER PUBLICATIONS

International Search Report and Written Opinion received for PCT Patent Application No. PCT/US2014/045642, dated Oct. 20, 2014, 5 pages.
Extended European Search Report received for European Patent Application No. 14823369.5, dated Dec. 5, 2016, 10 pages.
"Techniques for D2D Discovery", Qualcomm Incorporated, 3GPP Draft; RAN WG1, R1-132503, May 11, 2013, 7 pages (Author unknown).
(Continued)

*Primary Examiner* — Chi H Pham
*Assistant Examiner* — Raul Rivas

(57) ABSTRACT

Techniques for energy-efficient device discovery are described. In one embodiment, for example, user equipment may comprise logic, at least a portion of which is in hardware, the logic to initiate a synchronous operation mode, determine to announce one or more characteristics of a discovery zone of a wireless channel, and send a discovery announcement signal over the wireless channel, the discovery announcement signal describing the one or more characteristics of the discovery zone. Other embodiments are described and claimed.

13 Claims, 11 Drawing Sheets

(51) Int. Cl.
*H04W 28/04* (2009.01)
*H04W 72/08* (2009.01)
*H04W 56/00* (2009.01)
*H04W 84/18* (2009.01)
*H04W 28/08* (2009.01)
*H04W 40/24* (2009.01)
*H04W 80/04* (2009.01)
*H04W 88/02* (2009.01)
*H04W 8/00* (2009.01)
*H04B 15/00* (2006.01)
*H04J 11/00* (2006.01)
*H04W 72/04* (2009.01)
*H04W 72/12* (2009.01)
*H04W 84/04* (2009.01)

(52) U.S. Cl.
CPC ......... *H04W 48/16* (2013.01); *H04W 56/002* (2013.01); *H04W 72/044* (2013.01); *H04W 72/0413* (2013.01); *H04W 72/082* (2013.01); *H04W 72/1215* (2013.01); *H04W 80/04* (2013.01); *H04W 84/18* (2013.01); *H04W 88/02* (2013.01); *H04W 84/042* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01)

(56) References Cited

U.S. PATENT DOCUMENTS

| | | | |
|---|---|---|---|
| 2001/0021179 A1* | 9/2001 | Tiedemann, Jr. | H04B 1/70735 370/333 |
| 2007/0280160 A1* | 12/2007 | Kim | H04B 7/195 370/331 |
| 2009/0016249 A1 | 1/2009 | Li et al. | |
| 2009/0137250 A1* | 5/2009 | Kurimoto | H04W 36/32 455/436 |
| 2012/0134456 A1* | 5/2012 | Li | H04W 56/00 375/356 |
| 2012/0171954 A1* | 7/2012 | Rudland | H04W 52/0225 455/41.1 |
| 2013/0308490 A1* | 11/2013 | Lim | H04B 7/026 370/252 |
| 2014/0187283 A1* | 7/2014 | Nimbalker | H04W 72/048 455/550.1 |
| 2015/0289125 A1* | 10/2015 | Van Phan | H04W 76/023 455/434 |
| 2015/0304902 A1* | 10/2015 | Yu | H04W 36/165 455/436 |

OTHER PUBLICATIONS

"Evaluations of D2D Discovery Schemes", Institure for Information Industry, 3GPP Draft, RAN WGI, R132541, May 11, 2013, 4 pages (Author unknown).

Baccelli et al., "On the Design of Device-to-Device Autonomous Discovery", Communications Systems and Networks (COMSNETS), 2012 Fourth International Conference on IEEE, Jan. 3, 2012, 9 pages.

Author Unknown, "Techniques for D2D Communication" Qualcomm Incorporated—3GPP TSG-RAN WG1 #73—R1-132504, May 20-24, 2013.

* cited by examiner

Broadband Wireless Access System 1100

ENERGY-EFFICIENT DEVICE DISCOVERY TECHNIQUES

RELATED CASE

This application claims priority to U.S. Provisional Patent Application No. 61/843,826, filed Jul. 8, 2013, the entirety of which is hereby incorporated by reference.

TECHNICAL FIELD

Embodiments herein generally relate to communications between devices in broadband wireless communications networks.

BACKGROUND

In a cellular radio access network such as an evolved universal mobile telecommunications system terrestrial radio access network (E-UTRAN), mobile devices such as user equipment (UEs) may typically communicate with other mobile devices through one or more network nodes such as evolved node Bs (eNBs). However, in view of public safety considerations, it may be desirable that fixed and/or mobile devices of such networks be configured to support direct communication between mobile devices under various circumstances, such as public emergencies or service outages. In order to enable such direct communication, mobile devices may arranged to exchange discovery signals, and discovery intervals may be defined during which the discovery signals are to be exchanged. Although the timing of the discovery intervals may be defined according to a common timing reference, some mobile devices may not be able to obtain that common timing reference and may operate in an asynchronous mode. In conventional systems, if they are to ensure that they transmit discovery signals within time intervals during which synchronous-mode devices will be monitoring the wireless channel, asynchronous-mode devices may be forced to transmit discovery signals continually, at significant cost in terms of power consumption.

DETAILED DESCRIPTION

Figure 1:
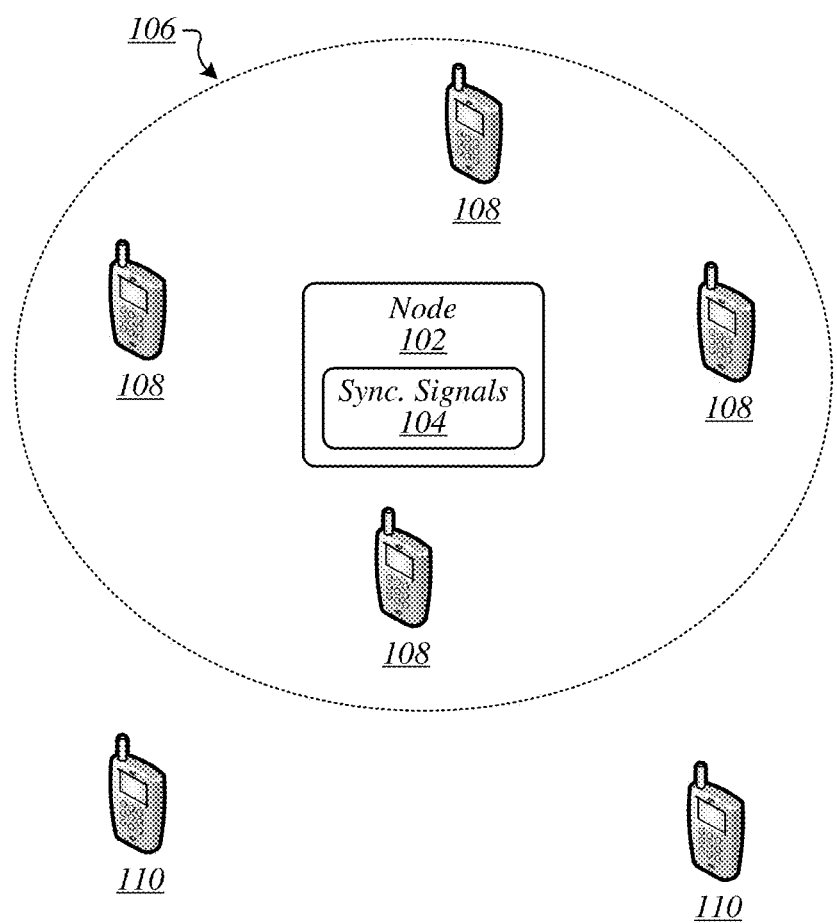
FIG. 1 illustrates an embodiment of an operating environment.

Various embodiments may be generally directed to energy-efficient device discovery techniques. In one embodiment, for example, user equipment may comprise logic, at least a portion of which is in hardware, the logic to initiate a synchronous operation mode, determine to announce one or more characteristics of a discovery zone of a wireless channel, and send a discovery announcement signal over the wireless channel, the discovery announcement signal describing the one or more characteristics of the discovery zone. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example operating environment 100 such as may be representative of various embodiments. In operating environment 100, a node 102 disseminates synchronization signals 104 within a coverage area 106. In some embodiments, node 102 may comprise a mobile device, such as a UE, that is operating as a synchronization source or peer radio head (PRH). In various other embodiments, node 102 may comprise a fixed device, such as an eNB. In some embodiments, synchronization signals 104 may comprise information defining a common timing reference. In various embodiments, one or more UEs located within coverage area 106 may receive synchronization signals 104 from node 102 and use them to enter a synchronous operation mode according to a common timing reference defined by synchronization signals 104. Operating environment 100 depicts four synchronous-mode UEs 108 that may be representative of UEs that enter a synchronous mode based on synchronization signals 104 received from node 102. In some embodiments, UEs located outside of coverage area 106 may be unable to receive synchronization signals 104 from node 102 and may operate in an asynchronous mode. Operating environment 100 depicts two asynchronous-mode UEs 110 that may be representative of UEs that operate in an asynchronous mode due to an inability to receive synchronization signals 104 from node 102. It is worthy of note that in some embodiments, while operating asynchronously with respect to the common timing reference provided by node 102, one or more of asynchronous-mode UEs 110 may still be synchronized with some other timing reference. For example, in various embodiments, one or more of asynchronous-mode UEs 110 may be synchronized with a timing reference provided by a synchronization node of a different network, and may thus have a different notion of time than that defined by synchronization signals 104. The embodiments are not limited in this context.

In various embodiments, synchronous-mode UEs 108 may be able to use a synchronous discovery protocol to discover each other. In some embodiments, according to the synchronous discovery protocol, synchronous-mode UEs 108 may only need to monitor the air interface and/or transmit discovery signals over the air interface during predetermined periodic time intervals. In various embodiments, the synchronous discovery protocol may comprise a low duty cycle and may allow synchronous-mode UEs 108 to enter a sleep state in between the periodic time intervals, resulting in energy savings on the part of the synchronous-mode UEs 108. However, in some embodiments, asynchronous-mode UEs 110 may be unable to use the synchronous discovery protocol, and may instead need to use an asynchronous discovery protocol. In various embodiments, the asynchronous discovery protocol may require the asynchronous-mode UEs 110 to continually transmit discovery signals and/or continuously monitor the air interface for discovery signals transmitted by other UEs, resulting in significantly increased levels of power consumption.

Disclosed herein are energy-efficient techniques for asynchronous device discovery. According to some such techniques, synchronous and asynchronous discovery regions may be defined within a discovery zone of a wireless channel. Information regarding the defined timing and/or structure of the discovery zone may be distributed to asynchronous-mode UEs, such as asynchronous-mode UEs 110 of FIG. 1, by synchronous-mode UEs, such as synchronous-mode UEs 108 of FIG. 1. Rather than continually transmitting discovery signals, asynchronous-mode UEs that are aware of the timing and/or structure of the discovery zone may then transmit discovery signals only during the defined asynchronous discovery region. As a result, the power consumption associated with discovery operations on the part of asynchronous-mode devices may be reduced. Other advantages may be associated with various embodiments, and the embodiments are not limited in this context.

Figure 2:
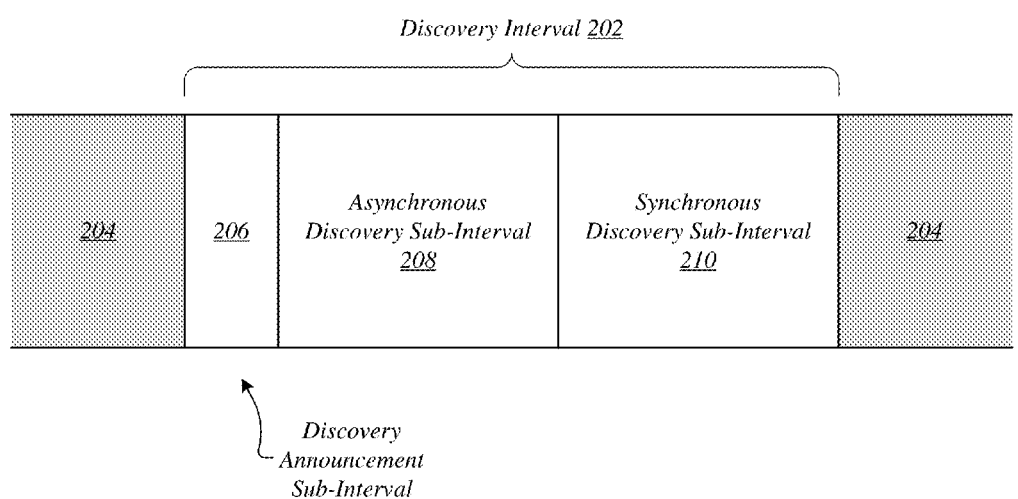
FIG. 2 illustrates an embodiment of a wireless channel.

FIG. 2 illustrates an example of a wireless channel 200 such as may be representative of some embodiments. More particularly, FIG. 2 illustrates an example of a discovery interval 202 for wireless channel 200, according to various techniques for energy-efficient asynchronous device discovery. As shown in FIG. 2, a portion of the time resources of wireless channel 200 are allocated to implement discovery interval 202, while other time resources of wireless channel 200 are comprised in non-discovery time intervals 204. In some embodiments, in order to conserve power in conjunction with discovery operations, synchronous-mode UEs may only utilize and/or monitor wireless channel 200 during discovery interval 202, and not do so during non-discovery time intervals 204. However, asynchronous-mode UEs may be unaware of the common timing reference according to which discovery interval 202 is demarcated from non-discovery time intervals 204. As such, in order to ensure that they transmit discovery signals during times at which synchronous-mode UEs are monitoring wireless channel 200, asynchronous-mode UEs in conventional systems may be forced to transmit such discovery signals continually. This may result in interference with non-discovery communications over wireless channel 200 during non-discovery time intervals 204, as well as increased power consumption on the part of the asynchronous-mode UEs.

In various embodiments, in order to address these drawbacks, techniques for energy-efficient asynchronous device discovery may be implemented, according to which discovery interval 202 may be divided into a discovery announcement sub-interval 206, an asynchronous discovery sub-interval 208, and a synchronous discovery sub-interval 210. In some embodiments, asynchronous discovery sub-interval 208 may comprise a time duration during which asynchronous-mode UEs are to transmit discovery signals over wireless channel 200 and synchronous-mode UEs are to monitor wireless channel 200 for discovery signals of asynchronous-mode UEs. In various embodiments, synchronous discovery sub-interval 210 may comprise a time duration during which synchronous-mode UEs are to transmit discovery signals over wireless channel 200 and/or monitor wireless channel 200 for discovery signals of other synchronous-mode UEs. In some embodiments, discovery announcement sub-interval 206 may comprise a time duration during which selected synchronous-mode UEs are to transmit discovery announcement signals to inform asynchronous-mode UEs of the timings and durations of asynchronous discovery sub-interval 208 and/or synchronous discovery sub-interval 210. In various embodiments, in addition to or instead of transmitting discovery announcement signals during defined discovery announcement sub-intervals, selected synchronous-mode UEs may transmit synchronization signals in order to extend a synchronization area of a wireless network node from which they receive those synchronization signals. In some such embodiments, such synchronous-mode UEs may include information describing the discovery interval in the synchronization signals that they transmit. In various embodiments, asynchronous-mode UEs in the extended synchronization area may use synchronization signals received from synchronous-mode UEs to switch to synchronous operation. The embodiments are not limited in this context.

Returning to FIG. 1, it is worthy of note that operating environment 100 may be representative of a variety of different scenarios in which a discovery interval such as discovery interval 202 of FIG. 2 may be implemented for a wireless channel in support of energy-efficient asynchronous device discovery. In an example embodiment of an out-of-coverage scenario, node 102, synchronous-mode UEs 108, and asynchronous-mode UEs 110 may all comprise UEs that are outside of any service provider coverage area, and node 102 may comprise a particular UE that operates as a synchronization source or PRH. In an example embodiment of a partial-coverage scenario, node 102 may comprise an eNB in a radio access network (RAN), synchronous-mode UEs 108 may comprise UEs within a coverage area of that eNB, and asynchronous-mode UEs 110 may comprise UEs that are outside the coverage areas of any eNBs of the RAN. In an example embodiment of an in-coverage scenario, node 102, synchronous-mode UEs 108, and asynchronous-mode UEs 110 may all be located within a coverage area of a non-synchronized RAN, and node 102 may comprise a particular UE that operates as a synchronization source or PRH. The embodiments are not limited to these examples.

Figure 3:
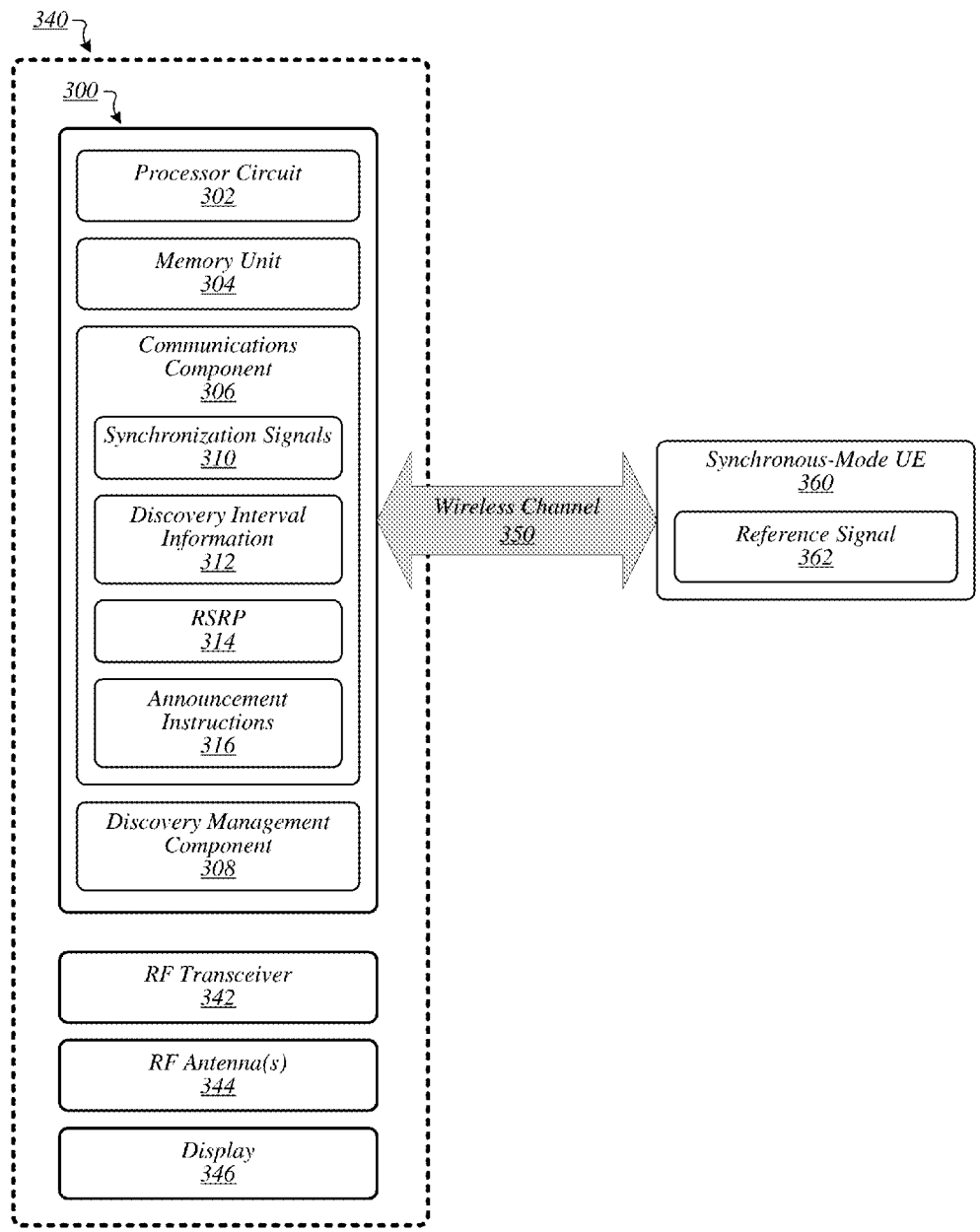
FIG. 3 illustrates an embodiment of a first apparatus and an embodiment of a first system.

FIG. 3 illustrates a block diagram of an apparatus 300 such as may be representative of node 102 of FIG. 1 in various embodiments. As shown in FIG. 3, apparatus 300 comprises multiple elements including a processor circuit 302, a memory unit 304, a communications component 306, and a discovery management component 308. The embodiments, however, are not limited to the type, number, or arrangement of elements shown in this figure.

In some embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In various embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a communications component 306. Communications component 306 may comprise logic, circuitry, and/or instructions operative to send messages to one or more remote devices and/or to receive messages from one or more remote devices. In some embodiments, communications component 306 may be operative to send and/or receive messages over one or more wireless connections, one or more wired connections, or a combination of both. In various embodiments, communications component 306 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 300 may comprise a discovery management component 308. Discovery management component 308 may comprise logic, circuitry, and/or instructions operative to manage operations performed by apparatus 300 and/or by one or more other devices in support of direct discovery and/or communication between mobile devices in a wireless network. In various embodiments, may be operative to control the timings of discovery signal transmissions on the part of one or more such mobile devices. The embodiments are not limited in this context.

FIG. 3 also illustrates a block diagram of a system 340. System 340 may comprise any of the aforementioned elements of apparatus 300. System 340 may further comprise a radio frequency (RF) transceiver 342. RF transceiver 342 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 342 may operate in accordance with one or more applicable standards in any version. The embodiments are not limited in this context.

In some embodiments, system 340 may comprise one or more RF antennas 344. Examples of any particular RF antenna 344 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 342 may be operative to send and/or receive messages and/or data using one or more RF antennas 344. The embodiments are not limited in this context.

In some embodiments, system 340 may comprise a display 346. Display 346 may comprise any display device capable of displaying information received from processor circuit 302. Examples for display 346 may include a television, a monitor, a projector, and a computer screen. In one embodiment, for example, display 346 may be implemented by a liquid crystal display (LCD), light emitting diode (LED) or other type of suitable visual interface. Display 346 may comprise, for example, a touch-sensitive display screen ("touchscreen"). In various implementations, display 346 may comprise one or more thin-film transistors (TFT) LCD including embedded transistors. The embodiments, however, are not limited to these examples.

In general operation, apparatus 300 and/or system 340 may be operative to facilitate synchronization among a plurality of wireless communications devices. In some embodiments, the plurality of wireless communications devices may comprise a plurality of UEs. In various embodiments, apparatus 300 and/or system 340 may itself comprise a UE. In an example embodiment, apparatus 300 and/or system 340 may comprise a UE operating as a synchronization source or PRH to enable synchronization among a plurality of out-of coverage UEs. In another example embodiment, apparatus 300 and/or system 340 may comprise a UE operating as a synchronization source or PRH to enable synchronization among a plurality of UEs located within a coverage area of a non-synchronized RAN. In some other embodiments, apparatus 300 and/or system 340 may comprise a fixed device, such as an eNB of a RAN. In an example of such an embodiment, apparatus 300 and/or system 340 may comprise an eNB that provides a synchronization reference to enable synchronization among a plurality of UEs within its coverage area. The embodiments are not limited to these examples.

In various embodiments, communications component 306 may be operative to send synchronization signals 310 to remote devices within range of apparatus 300 and/or system 340. Synchronization signals 310 may comprise one or more periodic signals that provide a common timing reference to one or more mobile devices that receive them. In some embodiments, apparatus 300 and/or system 340 may comprise an eNB, and synchronization signals 310 may comprise primary synchronization signals (PSSs) and/or secondary synchronization signals (SSSs). In various other embodiments, apparatus 300 and/or system 340 may comprise a UE operating as a synchronization source or PRH, and synchronization signals 310 may be constructed and/or sent according to a defined procedures for the transmission of timing reference signals on the part of synchronization sources and/or PRHs. The embodiments are not limited in this context.

In some embodiments, communications component 306 may be operative to send discovery interval information 312 to remote devices within range of apparatus 300 and/or system 340. Discovery interval information 312 may comprise information describing one or more characteristics of a discovery interval of a wireless channel 350, which may be the same as or similar to the discovery interval 202 of wireless channel 200 of FIG. 2 in various embodiments. In some embodiments, discovery interval information 312 may describe a structure of the discovery interval. For example, in various embodiments, discovery interval information 312 may indicate a respective duration for each of discovery announcement sub-interval 206, asynchronous discovery sub-interval 208, and synchronous discovery sub-interval 210 in discovery interval 202 of FIG. 2. In some embodiments, discovery management component 308 may be operative to dynamically determine the structure of the discovery interval. For example, in various embodiments, discovery management component 308 may be operative to dynamically determine the respective durations for one or more of discovery announcement sub-interval 206, asynchronous discovery sub-interval 208, and synchronous discovery sub-interval 210 in discovery interval 202 of FIG. 2, based on previously observed device discovery statistics. In some other embodiments, the structure of the discovery interval may be statically defined. In various embodiments, discovery interval information 312 may be comprised within synchronization signals 310. In some other embodiments, discovery interval information 312 may be comprised within one or more messages that are separate from synchronization signals 310, and may not necessarily be sent as frequently as synchronization signals 310. In yet other embodiments, the UEs that receive synchronization signals 310 may be pre-configured with information describing the discovery interval, and communications component 306 may not send discovery interval information 312. The embodiments are not limited in this context.

In various embodiments, communications component 306 may be operative to identify one or more synchronous-mode UEs, such as a synchronous-mode UE 360, that have successfully received synchronization signals 310 and entered a synchronous mode. In some embodiments, communications component 306 may be operative identify the one or more synchronous-mode UEs based on respective reference signals received from the one or more synchronous-mode UEs. For example, communications component 306 may be operative to identify synchronous-mode UE 360 as being a UE operating in the synchronous mode based on a reference signal 362 received from synchronous-mode UE 360. In various embodiments, discovery management component 308 may be operative to select one or more synchronous-mode UEs as announcement UEs. Each announcement UE may comprise a synchronous-mode UE that is to transmit a discovery announcement signal to inform nearby asynchronous-mode UEs of the structure of a discovery interval for wireless channel 350.

In some embodiments, discovery management component 308 may be operative to select a set of one or more announcement UEs according to a preference for synchronous-mode UEs that are closer to a cell edge of a cell served by apparatus 300 and/or system 340. In various embodiments, discovery management component 308 may be operative to select the set of announcement UEs based on reference signal received powers (RSRPs) for the respective reference signals received from the one or more synchronous-mode UEs. In some embodiments, discovery management component 308 may be operative to select synchronous-mode UEs for which the corresponding respective RSRPs are within a range that indicates that those UEs are close to the cell edge. For example, in various embodiments, based on an RSRP 314 for the reference signal 362 received from synchronous-mode UE 360, discovery management component 308 may be operative to determine that synchronous-mode UE 360 is near the cell edge, and may select synchronous-mode UE 360 as an announcement UE based on this determination. In some other embodiments, rather than selecting the set of announcement UEs based on RSRPs, discovery management component 308 may be operative to randomly or pseudo-randomly select the set of announcement UEs. In yet other embodiments, apparatus 300 and/or system 340 may not be involved in determining the set of announcement UEs. For example, in various embodiments, the UEs that receive synchronization signals 310 may be pre-configured with RSRP thresholds to apply to messages that they receive from apparatus 300 and/or system 340, and may apply those thresholds to determine for themselves whether they are to operate as announcement UEs. The embodiments are not limited in this context.

In some embodiments, communications component 306 may be operative to send announcement instructions 316 to instruct the selected set of announcement UEs to transmit discovery announcement signals. In various embodiments, communications component 306 may be operative to send announcement instructions 316 as a single message identifying each selected announcement UEs. In some other embodiments, communications component 306 may be operative to send announcement instructions 316 for each selected announcement UE in a separate respective message. In yet other embodiments, the UEs that receive synchronization signals 310 may determine for themselves whether they will operate as announcement UEs, and announcement instructions 316 may simply indicate that recipient synchronous-mode UEs should perform that determination of whether to begin sending discovery announcement signals. It is worthy of note that in various embodiments, apparatus 300 and/or system 340 may itself transmit discovery announcement signals over wireless channel 350. The embodiments are not limited in this context.

Figure 4:
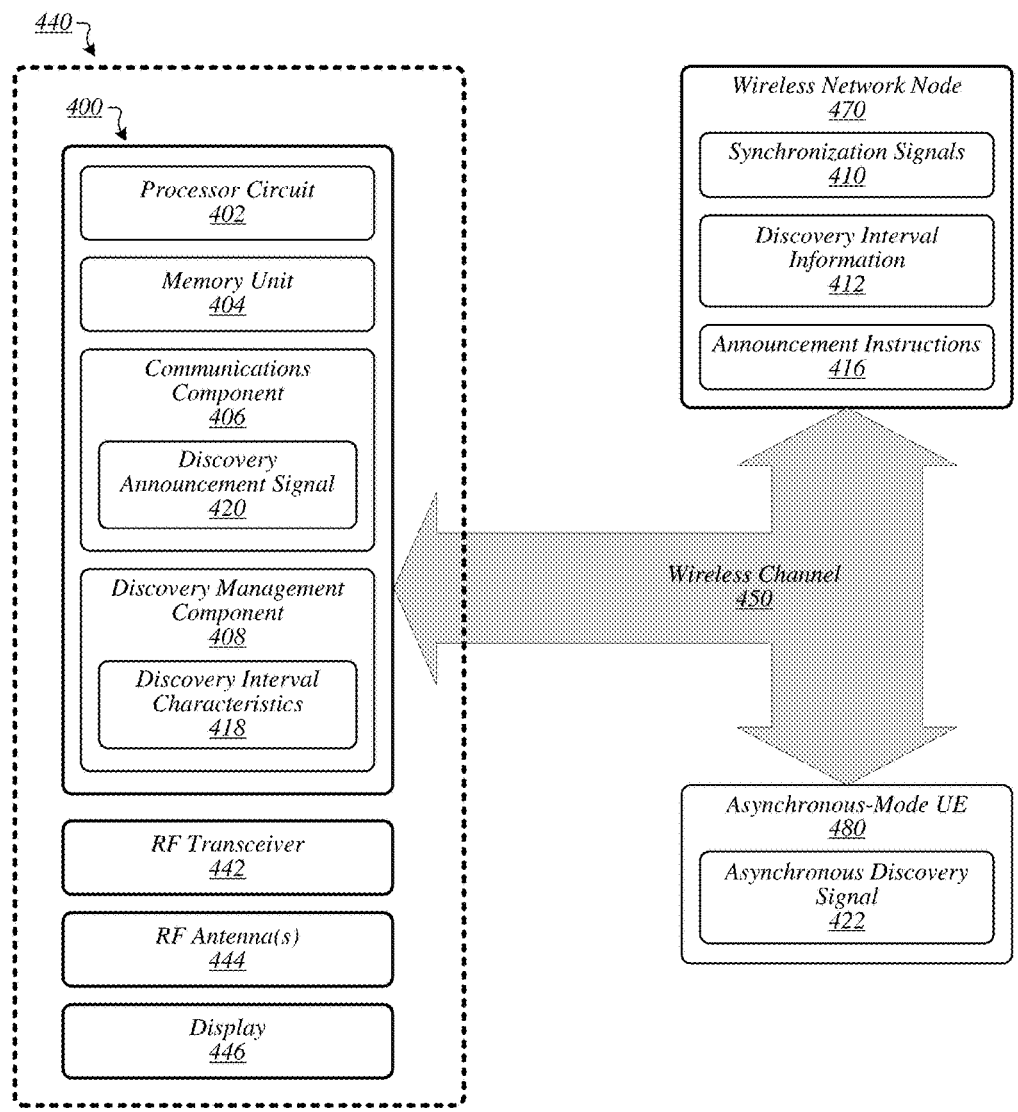
FIG. 4 illustrates an embodiment of a second apparatus and an embodiment of a second system.

FIG. 4 illustrates a block diagram of an apparatus 400 such as may be representative of a synchronous-mode UE 108 of FIG. 1 and/or synchronous-mode UE 360 of FIG. 3 in some embodiments. As shown in FIG. 4, apparatus 400 comprises multiple elements including a processor circuit 402, a memory unit 404, a communications component 406, and a discovery management component 408. The embodiments, however, are not limited to the type, number, or arrangement of elements shown in this figure.

In various embodiments, apparatus 400 may comprise processor circuit 402. Processor circuit 402 may be implemented using any processor or logic device. Examples of processor circuit 402 may include, without limitation, any of the examples previously presented with respect to processor circuit 302 of FIG. 3. The embodiments are not limited in this context.

In some embodiments, apparatus 400 may comprise or be arranged to communicatively couple with a memory unit 404. Memory unit 404 may be implemented using any machine-readable or computer-readable media capable of storing data, including both volatile and non-volatile memory. Examples of memory unit 404 may include, without limitation, any of the examples previously presented with respect to memory unit 304 of FIG. 3. It is worthy of note that some portion or all of memory unit 404 may be included on the same integrated circuit as processor circuit 402, or alternatively some portion or all of memory unit 404 may be disposed on an integrated circuit or other medium, for example a hard disk drive, that is external to the integrated circuit of processor circuit 402. Although memory unit 404 is comprised within apparatus 400 in FIG. 4, memory unit 404 may be external to apparatus 400 in various embodiments. The embodiments are not limited in this context.

In some embodiments, apparatus 400 may comprise a communications component 406. Communications component 406 may comprise logic, circuitry, and/or instructions operative to send messages to one or more remote devices and/or to receive messages from one or more remote devices. In various embodiments, communications component 406 may be operative to send and/or receive messages over one or more wireless connections, one or more wired connections, or a combination of both. In some embodiments, communications component 406 may additionally comprise logic, circuitry, and/or instructions operative to perform various operations in support of such communications. Examples of such operations may include selection of transmission and/or reception parameters and/or timing, packet and/or PDU construction and/or deconstruction, encoding and/or decoding, error detection, and/or error correction. The embodiments are not limited to these examples.

In various embodiments, apparatus 400 may comprise a discovery management component 408. Discovery management component 408 may comprise logic, circuitry, and/or instructions operative to manage operations performed by apparatus 400 and/or by one or more other devices in support of direct discovery and/or communication between mobile devices in a wireless network. In some embodiments, may be operative to control the timings of discovery signal transmissions on the part of one or more such mobile devices. The embodiments are not limited in this context.

FIG. 4 also illustrates a block diagram of a system 440. System 440 may comprise any of the aforementioned elements of apparatus 400. System 440 may further comprise a radio frequency (RF) transceiver 442. RF transceiver 442 may comprise one or more radios capable of transmitting and receiving signals using various suitable wireless communications techniques. Such techniques may involve communications across one or more wireless networks. Examples of such wireless networks may include, without limitation, any of the examples previously presented with respect to RF transceiver 342 of FIG. 3. In communicating across such networks, RF transceiver 442 may operate in accordance with one or more applicable standards in any version. The embodiments are not limited in this context.

In various embodiments, system 440 may comprise one or more RF antennas 444. Examples of any particular RF antenna 444 may include, without limitation, any of the examples previously presented with respect to RF antenna(s) 344 of FIG. 3. In some embodiments, RF transceiver 442 may be operative to send and/or receive messages and/or data using one or more RF antennas 444. The embodiments are not limited in this context.

In various embodiments, system 440 may comprise a display 446. Display 446 may comprise any display device capable of displaying information received from processor circuit 402. Examples of display 446 may include, without limitation, any of the examples previously presented with respect to display 346 of FIG. 3. The embodiments are not limited in this context.

During general operation of apparatus 400 and/or system 440, communications component 406 may be operative to receive synchronization signals 410 from a wireless network node 470 and enter a synchronous operation mode. In some embodiments, wireless network node 470 may comprise a fixed device such as an eNB, and apparatus 400 and/or system 440 may comprise a UE located within a coverage area of that fixed device. In various other embodiments, wireless network node 470 may comprise a UE that is operative to distribute synchronization signals 410 to other nearby UEs. For example, in some embodiments, wireless network node 470 may comprise a UE operating as a synchronization source or PRH. Synchronization signals 410 may comprise one or more periodic signals that provide a common timing reference to one or more UEs that receive them. Examples of synchronization signals 410 may include, without limitation, any of the examples previously presented with respect to synchronization signals 310 of FIG. 3. The embodiments are not limited in this context.

In various embodiments, discovery management component 408 may be operative to determine that apparatus 400 and/or system 440 is to operate as an announcement UE. In some such embodiments, communications component 406 may be operative to receive announcement instructions 416 from wireless network node 470, and discovery management component 408 may be operative to determine that apparatus 400 and/or system 440 is to operate as an announcement UE based on the received announcement instructions 416. In various other embodiments, discovery management component 408 may be operative to independently determine that apparatus 400 and/or system 440 is to operate as an announcement UE. In some such embodiments, discovery management component 408 may be operative to reach this conclusion based on a determination that apparatus 400 and/or system 440 is relatively close to a cell edge for a cell served by wireless network node 470. For example, in various embodiments, communications component 406 may be operative to determine one or more RSRPs for one or more received synchronization signals 410, and discovery management component 408 may be operative to determine that apparatus 400 and/or system 440 is close to the cell edge based on the one or more RSRPs, and thus that apparatus 400 and/or system 440 should operate as an announcement UE. The embodiments are not limited to this example.

In some embodiments, discovery management component 408 may be operative to identify discovery interval characteristics 418 of a discovery interval of a wireless channel 450, which may be the same as or similar to the discovery interval 202 of wireless channel 200 of FIG. 2 in various embodiments. In some embodiments, the wireless channel 450 may comprise a wireless channel over which apparatus 400 and/or system 440 exchanges discovery signals with one or more remote mobile devices. In various embodiments, discovery interval characteristics 418 may include, for example, a respective duration for one or more of a discovery announcement sub-interval, an asynchronous discovery sub-interval, and a synchronous discovery sub-interval of the discovery interval. In some embodiments, communications component 406 may be operative to receive discovery interval information 412 from wireless network node 460, and discovery management component 408 may be operative to identify discovery interval characteristics 418 based on the received discovery interval information 412. In various other embodiments, apparatus 400 and/or system 440 may be preconfigured with defined discovery interval characteristics 418. For example, in some embodiments, defined discovery interval characteristics 418 may be stored in memory unit 404. The embodiments are not limited in this context.

In various embodiments, based on a determination that apparatus 400 and/or system 440 is to operate as an announcement UE, communications component 406 may be operative to send a discovery announcement signal 420. More particularly, communications component 406 may be operative to send the discovery announcement signal 420 over wireless channel 450 during a discovery announcement sub-interval, such as discovery announcement sub-interval 206 of FIG. 2. In some embodiments, discovery announcement signal 420 may comprise information describing the timings and/or durations of one or more discovery intervals and/or sub-intervals, such as discovery interval 202, asynchronous discovery sub-interval 208, and/or synchronous discovery sub-interval 210 of FIG. 2. In various embodiments, discovery announcement signal 420 may indicate an amount of time until a start of an asynchronous discovery sub-interval and/or a duration of that asynchronous discovery sub-interval. In some embodiments, discovery announcement signal 420 may indicate an amount of time until a start of a synchronous discovery sub-interval and/or a duration of that synchronous discovery sub-interval. In various embodiments, one or more asynchronous-mode UEs may receive discovery announcement signal 420 over wireless channel 450 and may use the information in discovery announcement signal 420 to determine times at which to transmit asynchronous discovery signals over wireless channel 450. The embodiments are not limited in this context.

In some embodiments, communications component 406 may be operative to monitor wireless channel 450 for asynchronous discovery signals during an asynchronous discovery sub-interval described by discovery announcement signal 420. In various embodiments, one or more asynchronous-mode UEs that have received discovery announcement signal 420 may transmit asynchronous discovery signals during the asynchronous discovery sub-interval. For example, in some embodiments, an asynchronous-mode UE 480 may receive discovery announcement signal 420 over wireless channel 450 during a discovery announcement sub-interval, identify an asynchronous discovery sub-interval based on the received discovery announcement signal 420, and transmit an asynchronous discovery signal 422 over wireless channel 450 during the asynchronous discovery sub-interval. Communications component 406 may be operative to receive the asynchronous discovery signal 422 over wireless channel 450 during the asynchronous discovery sub-interval and to discover the asynchronous-mode UE 480 based on the received asynchronous discovery signal 422. The embodiments are not limited to this example.

In various embodiments, communications component 406 may be operative to monitor wireless channel 450 for synchronous discovery signals during a synchronous discovery sub-interval described by discovery announcement signal 420. In some embodiments, one or more synchronous-mode UEs may transmit synchronous discovery signals over wireless channel 450 during the synchronous discovery sub-interval. In various embodiments, communications component 406 may be operative to receive one or more of the synchronous discovery signals over wireless channel 450 during the synchronous discovery sub-interval and to discover one or more respective synchronous-mode UEs based on the one or more received synchronous discovery signals. In some embodiments, communications component 406 may additionally or alternatively be operative to send a synchronous discovery signal over wireless channel 450 during the synchronous discovery sub-interval, and apparatus 400 and/or system 440 may be discovered by one or more remote UEs based on that synchronous discovery signal. The embodiments are not limited in this context.

It is worthy of note that in various embodiments, the structure defined for asynchronous discovery signals transmitted over wireless channel 450 may differ from that defined for synchronous discovery signals transmitted over wireless channel 450. For example, in some embodiments, a simplified structure may be defined for asynchronous discovery signals such as asynchronous discovery signal 422, in order to facilitate the detection of asynchronous discovery signals by synchronous-mode UEs. The embodiments are not limited in this context.

In various embodiments, in addition to or instead of distributing discovery announcement signals such as discovery announcement signal 420, apparatus 400 and/or system 440 may be operative to send synchronization signals to asynchronous-mode UEs such as asynchronous-mode UE 480 that are not close enough to wireless network node 470 to receive synchronization signals 410 directly from wireless network node 470. In some embodiments, apparatus 400 and/or system 440 may be operative to act as a relay node and to retransmit the actual synchronization signals 410 that it receives from wireless network node 470. In various other embodiments, rather than relaying synchronization signals 410, apparatus 400 and/or system 440 may be operative to transmit like or similar signals at the same or similar times as those at which synchronization signals 410 are transmitted. In some embodiments, the transmission of synchronization signals may occur more frequently than the transmission of discovery signals, and thus may involve increased levels of power consumption. On the other hand, using synchronous-mode UEs to pass to synchronization signals to asynchronous-mode UEs that cannot receive them directly from wireless network node 470 may enable those asynchronous-mode UEs to switch to a more power-efficient synchronous mode. It is to be appreciated that whether it may be desirable, in any particular embodiment, for apparatus 400 and/or system 440 to be configured to transmit synchronization signals may depend on implementation-specific details.

Figure 5:
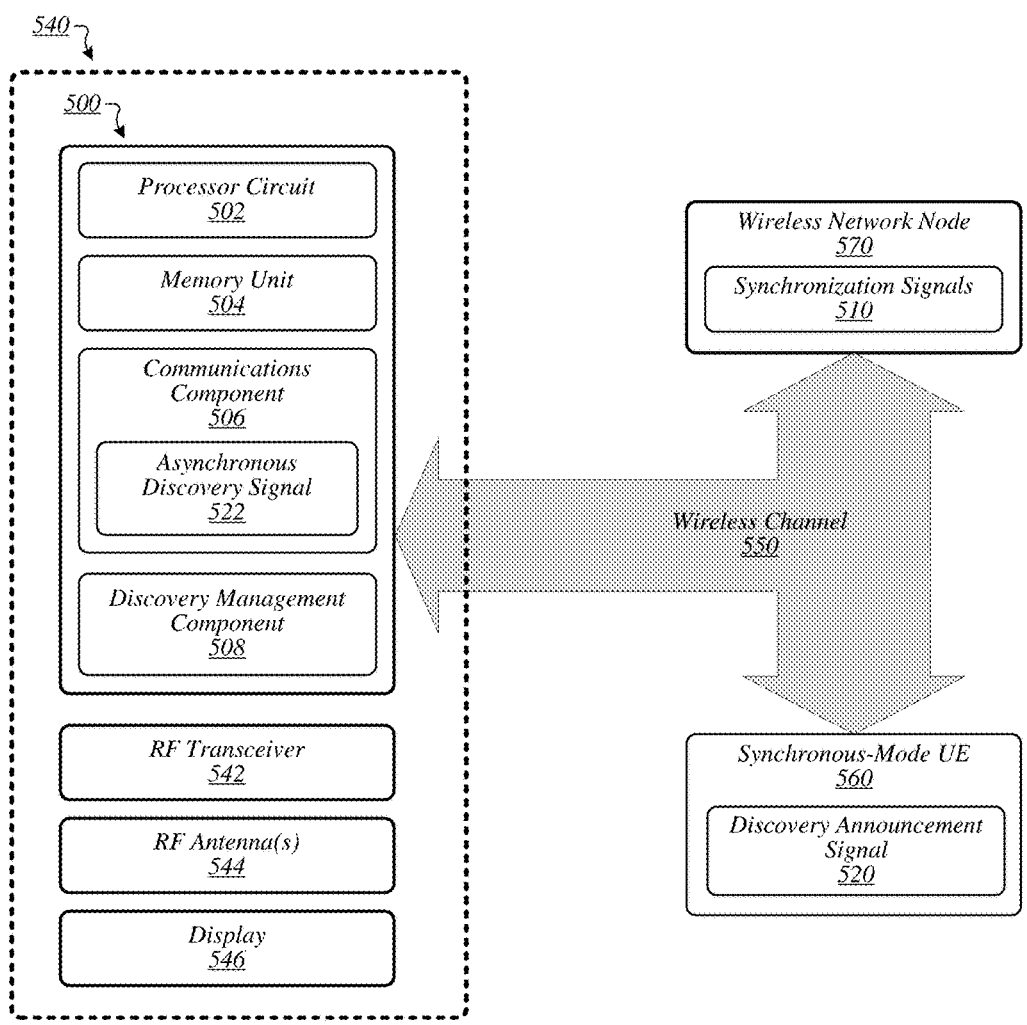
FIG. 5 illustrates an embodiment of a third apparatus and an embodiment of a third system.

FIG. 5 illustrates a block diagram of an apparatus 500 such as may be representative of an asynchronous-mode UE 110 of FIG. 1, and/or asynchronous-mode UE 480 of FIG. 4 in various embodiments. As shown in FIG. 5, apparatus 500 comprises multiple elements including a processor circuit 502, a memory unit 504, a communications component 506, and a discovery management component 508. The embodiments, however, are not limited to the type, number, or arrangement of elements shown in this figure.

In some embodiments, apparatus 500 may comprise processor circuit 502. Processor circuit 502 may be implemented using any processor or logic device. Examples of processor circuit 502 may include, without limitation, any of the examples previously presented with respect to processor circuit 302 of FIG. 3. The embodiments are not limited in this context.

In various embodiments, apparatus 500 may comprise or be arranged to communicatively couple with a memory unit 504. Memory unit 504 may be implemented using any machine-readable or computer-readable media capable of storing data, including both volatile and non-volatile memory. Examples of memory unit 504 may include, without limitation, any of the examples previously presented with respect to memory unit 304 of FIG. 3. It is worthy of note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. Although memory unit 504 is comprised within apparatus 500 in FIG. 5, memory unit 504 may be external to apparatus 500 in some embodiments. The embodiments are not limited in this context.

In various embodiments, apparatus 500 may comprise a communications component 506. Communications component 506 may comprise logic, circuitry, and/or instructions operative to send messages to one or more remote devices and/or to receive messages from one or more remote devices. In some embodiments, communications component 506 may be operative to send and/or receive messages over one or more wireless connections, one or more wired connections, or a combination of both. In various embodiments, communications component 506 may additionally comprise logic, circuitry, and/or instructions operative to perform various operations in support of such communications. Examples of such operations may include selection of transmission and/or reception parameters and/or timing, packet and/or PDU construction and/or deconstruction, encoding and/or decoding, error detection, and/or error correction. The embodiments are not limited to these examples.

In some embodiments, apparatus 500 may comprise a discovery management component 508. Discovery management component 508 may comprise logic, circuitry, and/or instructions operative to manage discovery operations performed by apparatus 500. In various embodiments, may be operative to control the timings of discovery signal transmissions on the part of apparatus 500. The embodiments are not limited in this context.

FIG. 5 also illustrates a block diagram of a system 540. System 540 may comprise any of the aforementioned elements of apparatus 500. System 540 may further comprise a radio frequency (RF) transceiver 542. RF transceiver 542 may comprise one or more radios capable of transmitting and receiving signals using various suitable wireless communications techniques. Such techniques may involve communications across one or more wireless networks. Examples of such wireless networks may include, without limitation, any of the examples previously presented with respect to RF transceiver 342 of FIG. 3. In communicating across such networks, RF transceiver 542 may operate in accordance with one or more applicable standards in any version. The embodiments are not limited in this context.

In some embodiments, system 540 may comprise one or more RF antennas 544. Examples of any particular RF antenna 544 may include, without limitation, any of the examples previously presented with respect to RF antenna(s) 344 of FIG. 3. In various embodiments, RF transceiver 542 may be operative to send and/or receive messages and/or data using one or more RF antennas 544. The embodiments are not limited in this context.

In some embodiments, system 540 may comprise a display 546. Display 546 may comprise any display device capable of displaying information received from processor circuit 502. Examples of display 546 may include, without limitation, any of the examples previously presented with respect to display 346 of FIG. 3. The embodiments are not limited in this context.

During general operation of apparatus 500 and/or system 540, a wireless network node 570 may transmit synchronization signals 510 over a wireless channel 550. In various embodiments, wireless network node 570 may comprise a fixed device, such as an eNB, that distributes synchronization signals 510 to UEs within its coverage area. In some other embodiments, wireless network node 570 may comprise a UE that is operative to distribute synchronization signals 510 to other nearby UEs. For example, in various embodiments, wireless network node 570 may comprise a UE operating as a synchronization source or PRH. Synchronization signals 510 may comprise one or more periodic signals that provide a common timing reference to one or more UEs that receive them. Examples of synchronization signals 510 may include, without limitation, any of the examples previously presented with respect to synchronization signals 310 of FIG. 3. The embodiments are not limited in this context.

In some embodiments, apparatus 500 and/or system 540 may not be able to properly receive the synchronization signals 510 transmitted over wireless channel 550. In various embodiments, for example, wireless network node 570 may comprise an eNB, and apparatus 500 and/or system 540 may comprise a UE that has moved outside of a coverage area of that eNB. In some other example embodiments, wireless network node 570 may comprise a UE operating as a synchronization source or PRH, and apparatus 500 and/or system 540 may comprise a UE that is located outside a transmission range of wireless network node 570. The embodiments are not limited to these examples.

In various embodiments, due to an inability to receive synchronization signals 510, apparatus 500 and/or system 540 may operate in an asynchronous operation mode. In some embodiments, upon entry into the asynchronous operation mode, apparatus 500 and/or system 540 may lack knowledge of appropriate time intervals during which to transmit discovery signals over wireless channel 550 and/or during which to monitor wireless channel 550 for discovery signals transmitted by other UEs. In various embodiments, under such circumstances, it may be necessary for apparatus 500 and/or system 540 to continually transmit discovery signals if it is to be ensured that at least some of those signals are transmitted within time intervals during which synchronous-mode UEs will be monitoring wireless channel 550.

In some embodiments, apparatus 500 and/or system 540 may make use of a received discovery announcement signal 520 in order to determine appropriate time intervals for discovery signal transmissions and avoid the need to continually transmit such signals. In various embodiments, communications component 506 may be operative to receive a discovery announcement signal 520 over wireless channel 550 from a synchronous-mode UE 560 operating as an announcement UE. In some embodiments, discovery announcement signal 520 may comprise information describing the timings and/or durations of one or more discovery intervals and/or sub-intervals, such as discovery interval 202, asynchronous discovery sub-interval 208, and/or synchronous discovery sub-interval 210 of FIG. 2. In various embodiments, discovery announcement signal 520 may indicate an amount of time until a start of an upcoming asynchronous discovery sub-interval and/or a duration of that asynchronous discovery sub-interval. In some embodiments, discovery announcement signal 420 may additionally indicate an amount of time until a start of a synchronous discovery sub-interval and/or a duration of that synchronous discovery sub-interval. The embodiments are not limited in this context.

In various embodiments, discovery management component 508 may be operative to determine, based on discovery announcement signal 520, that a start of an asynchronous discovery sub-interval has been reached. In some embodiments, this determination may occur immediately upon receipt of discovery announcement signal 520, while in various other embodiments, this determination may occur after some amount of time has elapsed following receipt of discovery announcement signal 520. In some embodiments, in response to the determination that a start of an asynchronous discovery sub-interval has been reached, communications component 506 may be operative to send an asynchronous discovery signal 522 over wireless channel 550. In various embodiments, synchronous-mode UE 560 may receive the asynchronous discovery signal 522, and may discover apparatus 500 and/or system 540 based on receipt of the asynchronous discovery signal 522. In some embodiments, communications component 506 may additionally be operative to monitor wireless channel 550 for asynchronous discovery signals transmitted by other asynchronous-mode UEs during the asynchronous discovery sub-interval, and may discover one or more such asynchronous-mode UEs as a result of that monitoring. The embodiments are not limited in this context.

In various embodiments, discovery management component 508 may be operative to determine, based on discovery announcement signal 520, that a start of a synchronous discovery sub-interval has been reached. In some embodiments, this determination may occur immediately upon receipt of discovery announcement signal 520, while in various other embodiments, this determination may occur after some amount of time has elapsed following receipt of discovery announcement signal 520. In some embodiments, communications component 506 may be operative to monitor wireless channel 550 for synchronous discovery signals transmitted by synchronous-mode UEs during the synchronous discovery sub-interval, and may discover one or more such synchronous-mode UEs as a result of that monitoring. In various embodiments, in order to support discovery of asynchronous-mode UEs that have not received discovery announcement signal 520, communications component 506 may additionally be operative to monitor wireless channel 550 for asynchronous discovery signals during the synchronous discovery sub-interval. Similarly, in some embodiments, communications component 506 may be operative to monitor wireless channel 550 for asynchronous discovery signals during time periods outside of the discovery interval. In various embodiments, although it may only send asynchronous discovery signals during asynchronous discovery sub-intervals, communications component 506 may be operative to continuously monitor wireless channel 550 for asynchronous discovery signals transmitted by other asynchronous-mode UEs, in order to maximize the chances of discovery of asynchronous-mode UEs that have not received discovery announcement signal 520. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
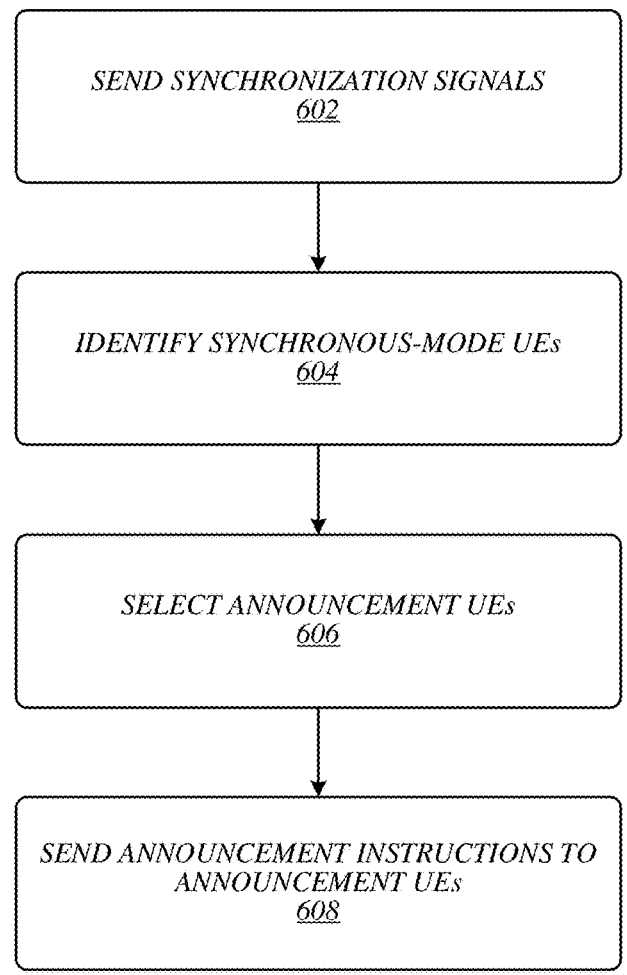
FIG. 6 illustrates an embodiment of a first logic flow.

FIG. 6 illustrates one embodiment of a logic flow 600, which may be representative of the operations executed by one or more embodiments described herein, such as operations that may be performed by apparatus 300 and/or system 340 of FIG. 3 in some embodiments. As shown in logic flow 600, synchronization signals may be sent at 602. For example, communications component 306 of FIG. 3 may be operative to send one or more synchronization signals 310 over wireless channel 350. At 604, one or more synchronous-mode UEs may be identified. For example, communications component 306 of FIG. 3 may be operative to identify one or more synchronous-mode UEs, which may include synchronous-mode UE 360. At 606, one or more announcement UEs may be selected from among the identified synchronous-mode UEs. For example, discovery management component 308 of FIG. 3 may be operative to select synchronous-mode UE 360 as an announcement UE based on the RSRP 314 for received reference signal 362. At 608, announcement instructions may be sent to the selected announcement UEs. For example, communications component 306 of FIG. 3 may be operative to send announcement instructions 316 to synchronous-mode UE 360. The embodiments are not limited to these examples.

Figure 7:
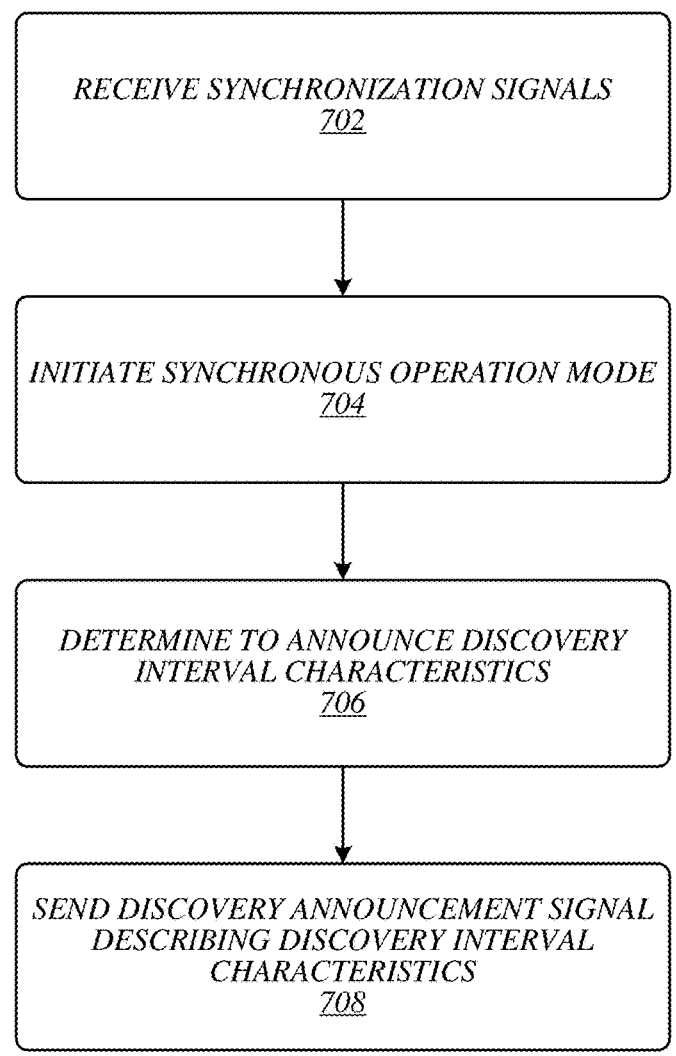
FIG. 7 illustrates an embodiment of a second logic flow.

FIG. 7 illustrates one embodiment of a logic flow 700, which may be representative of the operations executed by one or more embodiments described herein, such as operations that may be performed by apparatus 400 and/or system 440 of FIG. 4 in various embodiments. As shown in logic flow 700, synchronization signals may be received at 702. For example, communications component 406 of FIG. 4 may be operative to receive one or more synchronization signals 410 over wireless channel 450 from wireless network node 470. At 704, a synchronous operation mode may be initiated. For example, apparatus 400 and/or system 440 of FIG. 4 may be operative to initiate a synchronous operation mode based on receipt of synchronization signals 410. At 706, it may be determined that discovery interval characteristics are to be announced. For example, discovery management component 408 of FIG. 4 may be operative to determine that apparatus 400 and/or system 440 is to announce discovery interval characteristics 418. At 708, a discovery announcement signal may be sent that describes the discovery interval characteristics. For example, communications component 406 of FIG. 4 may be operative to send a discovery announcement signal 420 over wireless channel 450 that describes discovery interval characteristics 418. The embodiments are not limited to these examples.

Figure 8:
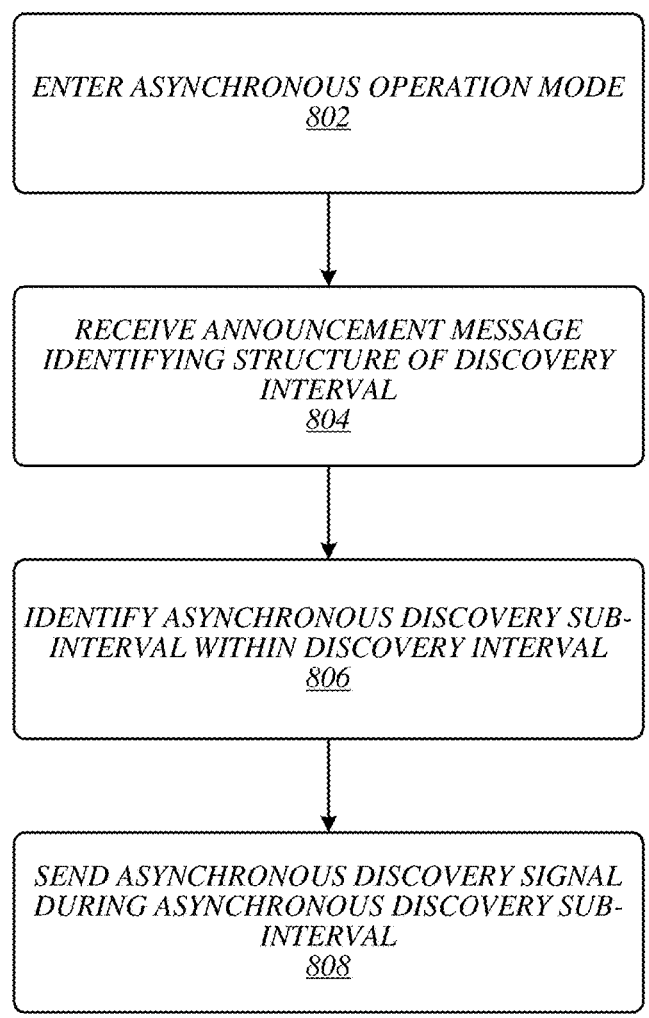
FIG. 8 illustrates an embodiment of a third logic flow.

FIG. 8 illustrates one embodiment of a logic flow 800, which may be representative of the operations executed by one or more embodiments described herein, such as operations that may be performed by apparatus 500 and/or system 540 of FIG. 5 in some embodiments. As shown in logic flow 800, an asynchronous operation mode may be entered at 802. For example, due to an inability to receive synchronization signals 510 from wireless network node 570, apparatus 500 and/or system 540 of FIG. 5 may be operative to enter an asynchronous operation mode. At 804, an announcement message may be received that identifies a structure of a discovery interval. For example, communications component 506 of FIG. 5 may be operative to receive a discovery announcement signal 520 over wireless channel 550 that identifies a structure of a discovery interval for wireless channel 550. At 806, an asynchronous discovery sub-interval within the discovery interval may be identified. For example, discovery management component 508 of FIG. 5 may be operative to identify an asynchronous discovery sub-interval within the discovery interval for wireless channel 550. At 808, an asynchronous discovery signal may be sent during the asynchronous discovery sub-interval. For example, communications component 506 of FIG. 5 may be operative to send an asynchronous discovery signal 522 over wireless channel 550 during an asynchronous discovery sub-interval identified by discovery management component 508. The embodiments are not limited to these examples.

Figure 9:
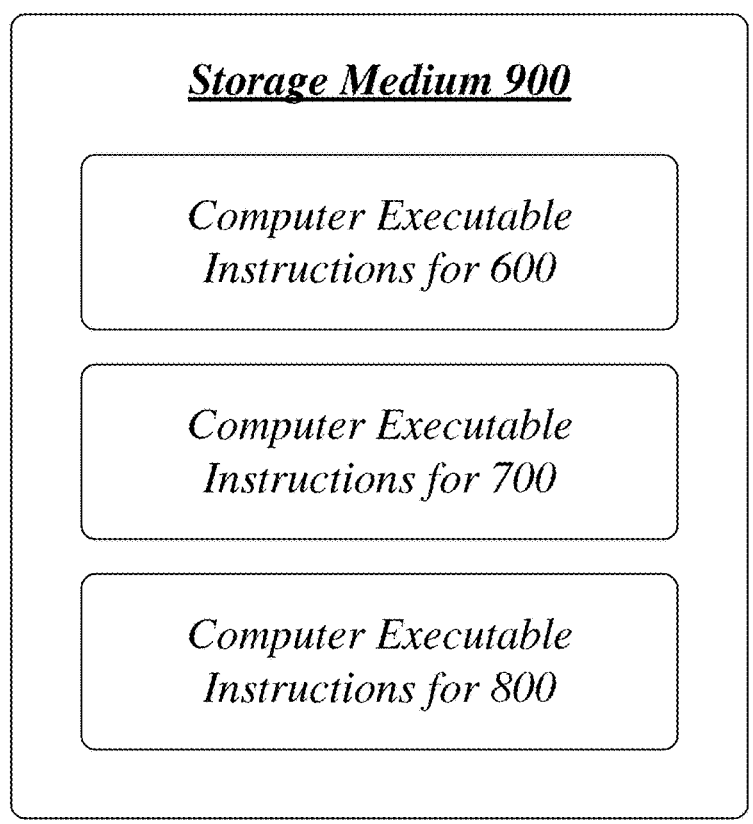
FIG. 9 illustrates an embodiment of a storage medium.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flow 600 of FIG. 6, logic flow 700 of FIG. 7, and/or logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
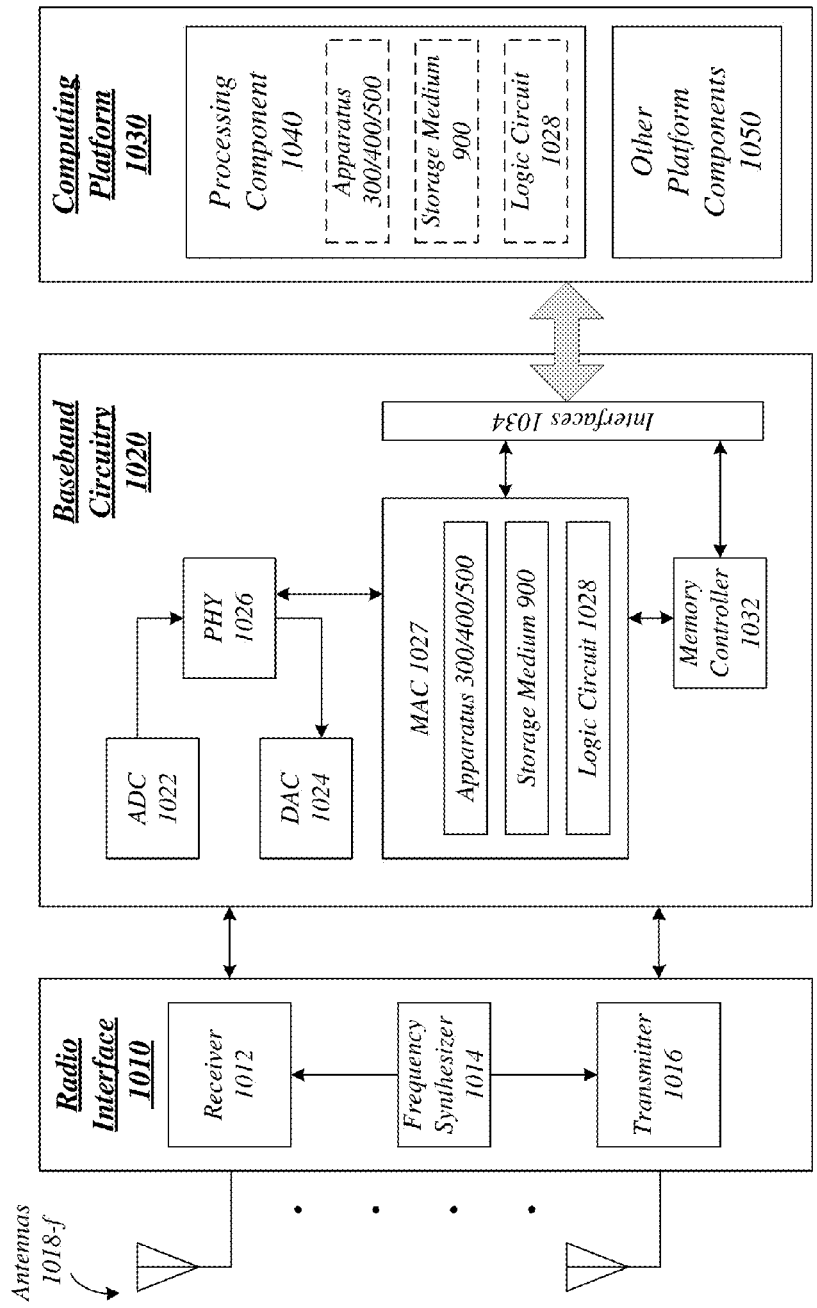
FIG. 10 illustrates an embodiment a device.

FIG. 10 illustrates an embodiment of a communications device 1000 that may implement one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, and storage medium 900 of FIG. 9. In various embodiments, device 1000 may comprise a logic circuit 1028. The logic circuit 1028 may include physical circuits to perform operations described for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, and logic flow 800 of FIG. 8, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, storage medium 900 of FIG. 9, and logic circuit 1028 in a single computing entity, such as entirely within a single device. Alternatively, the device 1000 may distribute portions of the structure and/or operations for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, storage medium 900 of FIG. 9, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, storage medium 900 of FIG. 9, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-f) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
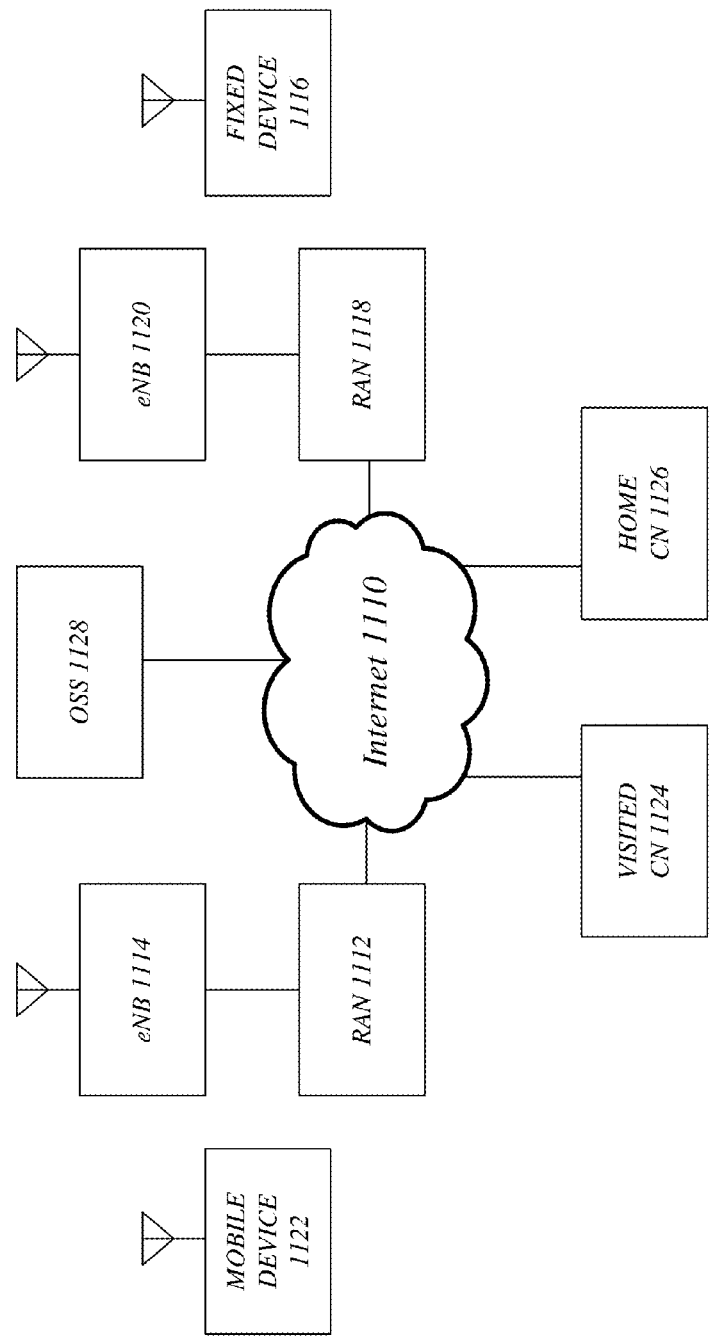
FIG. 11 illustrates an embodiment of a wireless network.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is user equipment (UE), comprising logic, at least a portion of which is in hardware, the logic to initiate a synchronous operation mode, determine to announce one or more characteristics of a discovery zone of a wireless channel, and send a discovery announcement signal over the wireless channel, the discovery announcement signal describing the one or more characteristics of the discovery zone.

In Example 2, the discovery zone of Example 1 may optionally comprise a discovery announcement region, an asynchronous discovery region, and a synchronous discovery region.

In Example 3, the logic of Example 2 may optionally send the discovery announcement signal using time resources of the discovery announcement region.

In Example 4, the logic of any of Examples 2 to 3 may optionally receive an asynchronous discovery signal using time resources of the asynchronous discovery region.

In Example 5, the logic of any of Examples 2 to 4 may optionally receive a synchronous discovery signal using time resources of the synchronous discovery region.

In Example 6, the logic of any of Examples 1 to 5 may optionally determine the one or more characteristics of the discovery zone based on received discovery zone information.

In Example 7, the logic of any of Examples 1 to 6 may optionally receive one or more synchronization signals from a wireless network node and send one or more synchronization signals to extend a synchronization area of the wireless network node.

In Example 8, the logic of any of Examples 1 to 7 may optionally determine to announce the one or more characteristics of the discovery zone based on a received announcement instruction.

In Example 9, the logic of any of Examples 1 to 7 may optionally determine to announce the one or more characteristics of the discovery zone in response to a determination that the UE is relatively close to a cell edge.

In Example 10, the logic of any of Examples 1 to 9 may optionally monitor the wireless channel for asynchronous discovery signals during a time duration corresponding to an asynchronous discovery region of the discovery zone.

In Example 11, the UE of any of Examples 1 to 10 may optionally comprise a display, a radio frequency (RF) transceiver, and one or more RF antennas.

Example 12 is at least one non-transitory computer-readable storage medium comprising a set of wireless communication instructions that, in response to being executed on user equipment (UE), cause the UE to select an asynchronous mode of operation, receive an announcement message identifying a structure of a discovery interval, identify an asynchronous discovery sub-interval within the discovery interval, and send an asynchronous discovery signal over a wireless channel during the asynchronous discovery sub-interval.

In Example 13, the at least one non-transitory computer-readable storage medium of Example 12 may optionally comprise wireless communication instructions that, in response to being executed on the UE, cause the UE to monitor the wireless channel for asynchronous discovery signals during the asynchronous discovery sub-interval.

In Example 14, the at least one non-transitory computer-readable storage medium of Example 13 may optionally comprise wireless communication instructions that, in response to being executed on the UE, cause the UE to discover an asynchronous-mode UE based on an asynchronous discovery signal received during the asynchronous discovery sub-interval.

In Example 15, the at least one non-transitory computer-readable storage medium of any of Examples 12 to 14 may optionally comprise wireless communication instructions that, in response to being executed on the UE, cause the UE to identify a synchronous discovery sub-interval of the discovery interval.

In Example 16, the at least one non-transitory computer-readable storage medium of Example 15 may optionally comprise wireless communication instructions that, in response to being executed on the UE, cause the UE to monitor the wireless channel for synchronous discovery signals during the synchronous discovery sub-interval.

In Example 17, the at least one non-transitory computer-readable storage medium of any of Examples 12 to 16 may optionally comprise wireless communication instructions that, in response to being executed on the UE, cause the UE to receive the announcement message during a discovery announcement sub-interval of the discovery interval.

In Example 18, the at least one non-transitory computer-readable storage medium of any of Examples 12 to 17 may optionally comprise wireless communication instructions that, in response to being executed on the UE, cause the UE to receive the announcement message over the wireless channel.

In Example 19, the at least one non-transitory computer-readable storage medium of any of Examples 12 to 18 may optionally comprise wireless communication instructions that, in response to being executed on the UE, cause the UE to continuously monitor the wireless channel for asynchronous discovery signals.

In Example 20, the asynchronous discovery signal of any of Examples 12 to 19 may optionally comprise a simplified structure with respect to one or more synchronous discovery signals transmitted over the wireless channel.

In Example 21, the at least one non-transitory computer-readable storage medium of any of Examples 12 to 20 may optionally comprise wireless communication instructions that, in response to being executed on the UE, cause the UE to receive one or more synchronization signals from a synchronous-mode UE and switch to a synchronous mode of operation based on the receipt of the one or more synchronization signals.

Example 22 is a wireless communication method, comprising identifying a plurality of user equipment (UEs) operating in a synchronous mode, selecting, by a processor circuit at a wireless network node, one or more announcement UEs from among the plurality of UEs operating in the synchronous mode, and sending announcement instructions indicating that the one or more announcement UEs are to transmit discovery announcement signals over a wireless channel.

In Example 23, the announcement instructions of Example 22 may optionally indicate that the one or more announcement UEs are to transmit discovery announcement signals over the wireless channel during a discovery interval.

In Example 24, the discovery interval of Example 23 may optionally comprise a discovery announcement sub-interval, an asynchronous discovery sub-interval, and a synchronous discovery sub-interval.

In Example 25, the announcement instructions of Example 24 may optionally indicate that the one or more announcement UEs are to transmit discovery announcement signals over the wireless channel during the discovery announcement sub-interval.

In Example 26, the wireless communication method of any of Examples 23 to 25 may optionally comprise dynamically determining a structure of the discovery interval.

In Example 27, the wireless communication method of any of Examples 22 to 26 may optionally comprise selecting the one or more announcement UEs based on one or more reference signal received powers (RSRPs).

In Example 28, the wireless communication method of any of Examples 22 to 26 may optionally comprise randomly or pseudo-randomly selecting the one or more announcement UEs.

In Example 29, the wireless communication method of any of Examples 22 to 28 may optionally comprise sending a set of synchronization signals to provide a common timing reference.

In Example 30, the set of synchronization signals of Example 29 may optionally comprise one or more primary synchronization signals and one or more secondary synchronization signals.

In Example 31, the wireless network node of any of Examples 22 to 30 may optionally comprise a UE operating as a synchronization source.

Example 32 is at least one non-transitory computer-readable storage medium comprising a set of instructions that, in response to being executed on a computing device, cause the computing device to perform a wireless communication method according to any of Examples 22 to 31.

Example 33 is an apparatus, comprising means for performing a wireless communication method according to any of Examples 22 to 31.

Example 34 is a system, comprising an apparatus according to Example 33, a radio frequency (RF) transceiver, and one or more RF antennas.

Example 35 is user equipment (UE), comprising a processor circuit to select an asynchronous mode of operation, receive an announcement message identifying a structure of a discovery interval, identify an asynchronous discovery sub-interval within the discovery interval, and send an asynchronous discovery signal over an air interface during the asynchronous discovery sub-interval.

In Example 36, the processor circuit of Example 35 may optionally monitor the air interface for asynchronous discovery signals during the asynchronous discovery sub-interval.

In Example 37, the processor circuit of Example 36 may optionally discover an asynchronous-mode UE based on an asynchronous discovery signal received during the asynchronous discovery sub-interval.

In Example 38, the processor circuit of any of Examples 35 to 37 may optionally identify a synchronous discovery sub-interval of the discovery interval.

In Example 39, the processor circuit of Example 38 may optionally monitor the air interface for synchronous discovery signals during the synchronous discovery sub-interval.

In Example 40, the processor circuit of any of Examples 35 to 39 may optionally receive the announcement message during a discovery announcement sub-interval of the discovery interval.

In Example 41, the processor circuit of any of Examples 35 to 40 may optionally receive the announcement message over the air interface.

In Example 42, the processor circuit of any of Examples 35 to 41 may optionally continuously monitor the air interface for asynchronous discovery signals.

In Example 43, the asynchronous discovery signal of any of Examples 35 to 42 may optionally comprise a simplified structure with respect to one or more synchronous discovery signals transmitted over the air interface.

In Example 44, the processor circuit of any of Examples 35 to 43 may optionally receive one or more synchronization signals from a synchronous-mode UE and switch to a synchronous mode of operation based on the receipt of the one or more synchronization signals.

In Example 45, the UE of any of Examples 35 to 44 may optionally comprise a display, a radio frequency (RF) transceiver, and one or more RF antennas.

Example 46 is at least one non-transitory computer-readable storage medium comprising a set of instructions that, in response to being executed on a wireless network node, cause the wireless network node to identify a plurality of user equipment (UEs) operating in a synchronous mode, select one or more announcement UEs from among the plurality of UEs operating in the synchronous mode, and send announcement instructions indicating that the one or more announcement UEs are to transmit discovery announcement signals over a wireless channel.

In Example 47, the announcement instructions of Example 46 may optionally indicate that the one or more announcement UEs are to transmit discovery announcement signals over the wireless channel during a discovery interval.

In Example 48, the discovery interval of Example 47 may optionally comprise a discovery announcement sub-interval, an asynchronous discovery sub-interval, and a synchronous discovery sub-interval.

In Example 49, the announcement instructions of Example 48 may optionally indicate that the one or more announcement UEs are to transmit discovery announcement signals over the wireless channel during the discovery announcement sub-interval.

In Example 50, the at least one non-transitory computer-readable storage medium of any of Examples 47 to 49 may optionally comprise instructions that, in response to being executed on the wireless network node, cause the wireless network node to dynamically determine a structure of the discovery interval.

In Example 51, the at least one non-transitory computer-readable storage medium of any of Examples 46 to 50 may optionally comprise instructions that, in response to being executed on the wireless network node, cause the wireless network node to select the one or more announcement UEs based on one or more reference signal received powers (RSRPs).

In Example 52, the at least one non-transitory computer-readable storage medium of any of Examples 46 to 50 may optionally comprise instructions that, in response to being executed on the wireless network node, cause the wireless network node to randomly or pseudo-randomly select the one or more announcement UEs.

In Example 53, the at least one non-transitory computer-readable storage medium of any of Examples 46 to 52 may optionally comprise instructions that, in response to being executed on the wireless network node, cause the wireless network node to send a set of synchronization signals to provide a common timing reference.

In Example 54, the set of synchronization signals of Example 53 may optionally comprise one or more primary synchronization signals and one or more secondary synchronization signals.

In Example 55, the wireless network node of any of Examples 46 to 54 may optionally comprise a UE operating as a synchronization source.

Example 56 is a wireless communication method, comprising entering a synchronous operation mode, determining, by a processor circuit, to announce one or more characteristics of a discovery interval of a wireless channel, and sending a discovery announcement signal over the wireless channel, the discovery announcement signal describing the one or more characteristics of the discovery interval.

In Example 57, the discovery interval of Example 56 may optionally comprise a discovery announcement sub-interval, an asynchronous discovery sub-interval, and a synchronous discovery sub-interval.

In Example 58, the wireless communication method of Example 57 may optionally comprise sending the discovery announcement signal during the discovery announcement sub-interval.

In Example 59, the wireless communication method of any of Examples 57 to 58 may optionally comprise receiving an asynchronous discovery signal during the asynchronous discovery sub-interval.

In Example 60, the wireless communication method of any of Examples 57 to 59 may optionally comprise receiving a synchronous discovery signal during the synchronous discovery sub-interval.

In Example 61, the wireless communication method of any of Examples 56 to 60 may optionally comprise determining the one or more characteristics of the discovery interval based on received discovery interval information.

In Example 62, the wireless communication method of any of Examples 56 to 61 may optionally comprise receiving one or more synchronization signals from a wireless network node, and sending one or more synchronization signals to extend a synchronization area of the wireless network node.

In Example 63, the set of received synchronization signals of Example 62 may optionally comprise at least one primary synchronization signal and at least one secondary synchronization signal.

In Example 64, the wireless communication method of any of Examples 56 to 63 may optionally comprise determining to announce the one or more characteristics of the discovery interval based on a received announcement instruction.

In Example 65, the wireless communication method of any of Examples 56 to 64 may optionally comprise determining to announce the one or more characteristics of the discovery interval in response to a determination, based on a reference signal received power (RSRP), that the UE is relatively close to a cell edge.

Example 66 is at least one non-transitory computer-readable storage medium comprising a set of instructions that, in response to being executed on a computing device, cause the computing device to perform a wireless communication method according to any of Examples 56 to 65.

Example 67 is an apparatus, comprising means for performing a wireless communication method according to any of Examples 56 to 65.

Example 68 is a system, comprising an apparatus according to Example 67, a display, a radio frequency (RF) transceiver, and one or more RF antennas.

Example 69 is a wireless network node, comprising logic, at least a portion of which is in hardware, the logic to identify a plurality of user equipment (UEs) operating in a synchronous mode, select one or more announcement UEs from among the plurality of UEs operating in the synchronous mode, and send announcement instructions indicating that the one or more announcement UEs are to transmit discovery announcement signals over a wireless channel.

In Example 70, the announcement instructions of Example 69 may optionally indicate that the one or more announcement UEs are to transmit discovery announcement signals over the wireless channel during a discovery interval.

In Example 71, the discovery interval of Example 70 may optionally comprise a discovery announcement sub-interval, an asynchronous discovery sub-interval, and a synchronous discovery sub-interval.

In Example 72, the announcement instructions of Example 71 may optionally indicate that the one or more announcement UEs are to transmit discovery announcement signals over the wireless channel during the discovery announcement sub-interval.

In Example 73, the logic of any of Examples 70 to 72 may optionally dynamically determine a structure of the discovery interval.

In Example 74, the discovery interval of any of Examples 70 to 72 may optionally comprise a statically configured structure.

In Example 75, the logic of any of Examples 69 to 74 may optionally select the one or more announcement UEs based on one or more reference signal received powers (RSRPs).

In Example 76, the logic of any of Examples 69 to 74 may optionally randomly or pseudo-randomly select the one or more announcement UEs.

In Example 77, the logic of any of Examples 69 to 76 may optionally send a set of synchronization signals to provide a common timing reference.

In Example 78, the set of synchronization signals of Example 77 may optionally comprise one or more primary synchronization signals and one or more secondary synchronization signals.

Example 79 is a system, comprising a wireless network node according to any of Examples 69 to 78, a radio frequency (RF) transceiver, and one or more RF antennas.

Example 80 is at least one non-transitory computer-readable storage medium comprising a set of wireless communication instructions that, in response to being executed on user equipment (UE), cause the UE to enter a synchronous operation mode based on one or more received synchronization signals, determine to announce one or more characteristics of a discovery interval of a wireless channel, and send a discovery announcement signal over the wireless channel during a discovery announcement sub-interval of the discovery interval, the discovery announcement signal describing the one or more characteristics of the discovery interval.

In Example 81, the discovery interval of Example 80 may optionally comprise an asynchronous discovery sub-interval and a synchronous discovery sub-interval.

In Example 82, the at least one non-transitory computer-readable storage medium of Example 81 may optionally comprise wireless communication instructions that, in response to being executed on the UE, cause the UE to discover a synchronous-mode UE based on a synchronous discovery signal received during the synchronous discovery sub-interval.

In Example 83, the at least one non-transitory computer-readable storage medium of Example 82 may optionally comprise wireless communication instructions that, in response to being executed on the UE, cause the UE to monitor the wireless channel during the asynchronous discovery sub-interval, and receive an asynchronous discovery signal during the asynchronous discovery sub-interval as a result of said monitoring.

In Example 84, the asynchronous discovery signal of Example 83 may optionally comprise a simplified structure in comparison to the synchronous discovery signal.

In Example 85, the at least one non-transitory computer-readable storage medium of any of Examples 83 to 84 may optionally comprise wireless communication instructions that, in response to being executed on the UE, cause the UE to discover an asynchronous-mode UE based on the received asynchronous discovery signal.

In Example 86, the at least one non-transitory computer-readable storage medium of any of Examples 80 to 85 may optionally comprise wireless communication instructions that, in response to being executed on the UE, cause the UE to determine the one or more characteristics of the discovery interval based on received discovery interval information.

In Example 87, the at least one non-transitory computer-readable storage medium of any of Examples 80 to 86 may optionally comprise wireless communication instructions that, in response to being executed on the UE, cause the UE to receive the one or more received synchronization signals from a wireless network node, and send one or more synchronization signals to extend a synchronization area of the wireless network node.

In Example 88, the at least one non-transitory computer-readable storage medium of any of Examples 80 to 87 may optionally comprise wireless communication instructions that, in response to being executed on the UE, cause the UE to determine to announce the one or more characteristics of the discovery interval based on a received announcement instruction.

In Example 89, the at least one non-transitory computer-readable storage medium of any of Examples 80 to 87 may optionally comprise wireless communication instructions that, in response to being executed on the UE, cause the UE to determine to announce the one or more characteristics of the discovery interval in response to a determination, based on a reference signal received power (RSRP), that the UE is relatively close to a cell edge.

Example 90 is a wireless communication method, comprising selecting, by logic circuitry, an asynchronous mode of operation, receiving an announcement message identifying a structure of a discovery zone, identifying an asynchronous discovery region within the discovery zone, and sending an asynchronous discovery signal over an air interface using time resources of the asynchronous discovery region.

In Example 91, the wireless communication method of Example 90 may optionally comprise monitoring the air interface for asynchronous discovery signals during the asynchronous discovery region.

In Example 92, the wireless communication method of Example 91 may optionally comprise discovering an asynchronous-mode UE based on an asynchronous discovery signal received during the asynchronous discovery region.

In Example 93, the wireless communication method of any of Examples 90 to 92 may optionally comprise identifying a synchronous discovery region of the discovery zone.

In Example 94, the wireless communication method of Example 93 may optionally comprise monitoring the air interface for synchronous discovery signals during the synchronous discovery region.

In Example 95, the wireless communication method of any of Examples 90 to 94 may optionally comprise receiving the announcement message during a discovery announcement region of the discovery zone.

In Example 96, the wireless communication method of any of Examples 90 to 95 may optionally comprise receiving the announcement message over the air interface.

In Example 97, the wireless communication method of any of Examples 90 to 96 may optionally comprise continuously monitoring the air interface for asynchronous discovery signals.

In Example 98, the asynchronous discovery signal of any of Examples 90 to 97 may optionally comprise a simplified structure with respect to one or more synchronous discovery signals transmitted over the air interface.

In Example 99, the wireless communication method of any of Examples 90 to 98 may optionally comprise receiving one or more synchronization signals from a synchronous-mode UE, and switching to a synchronous mode of operation based on the receipt of the one or more synchronization signals.

Example 100 is at least one non-transitory computer-readable storage medium comprising a set of instructions that, in response to being executed on a computing device, cause the computing device to perform a wireless communication method according to any of Examples 90 to 99.

Example 101 is an apparatus, comprising means for performing a wireless communication method according to any of Examples 90 to 99.

Example 102 is a system, comprising an apparatus according to Example 101, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   logic for user equipment (UE), at least a portion of the logic comprised in circuitry coupled to the memory, the logic to:
      determine that the UE is to operate as a synchronization source based on a determination that a measured reference signal received power (RSRP) is below an RSRP threshold comprised in a message received from an evolved node B (eNB) while the UE is located within a coverage area of the eNB;
      determine a timing reference for device-to-device discovery; and
      generate synchronization signals for transmission by the UE, the synchronization signals to indicate the timing reference for device-to-device discovery.

2. The apparatus of claim 1, the logic to determine the timing reference based on one or more synchronization signals received from the eNB.

3. The apparatus of claim 1, the logic to determine the timing reference based on one or more synchronization signals received from a second UE.

4. The apparatus of claim 1, comprising:
   at least one radio frequency (RF) transceiver; and
   at least one RF antenna.

5. The apparatus of claim 4, comprising a touchscreen display.

6. At least one non-transitory computer-readable storage medium comprising a set of instructions that, in response to being executed at user equipment (UE), cause the UE to:
   determine that the UE is to operate as a synchronization source based on a determination that a measured reference signal received power (RSRP) is below an RSRP threshold comprised in a message received from an evolved node B (eNB) while the UE is located within a coverage area of the eNB;
   determine a timing reference for device-to-device discovery; and
   generate synchronization signals for transmission by the UE, the synchronization signals to indicate the timing reference for device-to-device discovery.

7. The at least one non-transitory computer-readable storage medium of claim 6, comprising instructions that, in response to being executed at the UE, cause the UE to determine the timing reference based on one or more synchronization signals received from the eNB.

8. The at least one non-transitory computer-readable storage medium of claim 6, comprising instructions that, in response to being executed at the UE, cause the UE to determine the timing reference based on one or more synchronization signals received from a second UE.

9. User equipment (UE), comprising:
   baseband circuitry to:
      determine that the UE is to operate as a synchronization source based on a determination that a measured reference signal received power (RSRP) is below an RSRP threshold comprised in a message received from an evolved node B (eNB) while the UE is located within a coverage area of the eNB;
      determine a timing reference for device-to-device discovery; and generate synchronization signals indicating the timing reference for device-to-device discovery; and a radio frequency (RF) transceiver coupled to the baseband circuitry, the RF transceiver to transmit the synchronization signals.

10. The UE of claim 9, the baseband circuitry to determine the timing reference based on one or more synchronization signals received from the eNB.

11. The UE of claim 9, the baseband circuitry to determine the timing reference based on one or more synchronization signals received from a second UE.

12. The UE of claim 9, comprising at least one RF antenna coupled to the RF transceiver.

13. The UE of claim 12, comprising a touchscreen display.

* * * * *